(No Model.)
B. F. ADAMS.
KITCHEN UTENSIL.
No. 254,427. Patented Feb. 28, 1882.
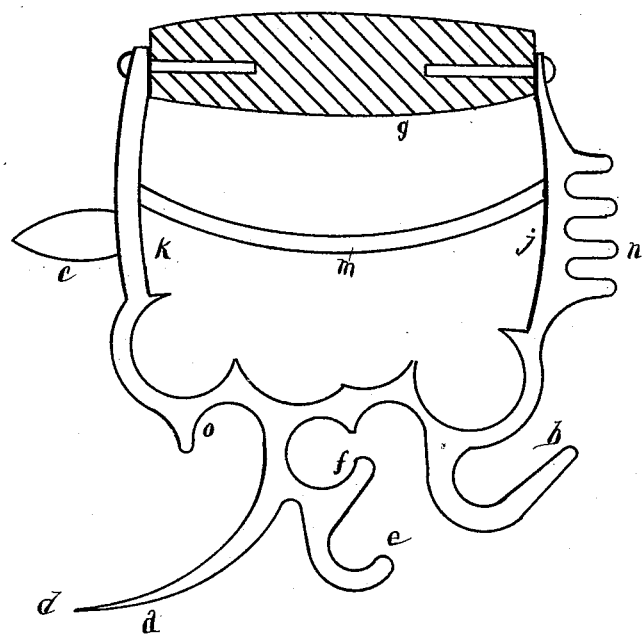
Witnesses.
W. J. Miller
C. B. Kingsbury
Inventor
Benjamin F. Adams
By Allen Webster atty

UNITED STATES PATENT OFFICE.

BENJAMIN F. ADAMS, OF SPRINGFIELD, MASSACHUSETTS.

KITCHEN UTENSIL.

SPECIFICATION forming part of Letters Patent No. 254,427, dated February 28, 1882.

Application filed January 24, 1882. (No model.)

*To all whom it may concern:*

Be it known that I, BENJAMIN F. ADAMS, of Springfield, in the county of Hampden and State of Massachusetts, have invented new and useful Improvements in Kitchen Utensils, of which the following is a specification, reference being had to the accompanying drawing and letters of reference marked thereon, which form a part of this specification.

My invention relates to implements for handling stove-lids, pots, dishes, and kitchen utensils generally, and is adapted also for use as a convenient can-opener and other convenient uses in the kitchen.

My invention consists in the arrangement of various hooks and projections, a can-opener, tack-puller, &c., in convenient form, and provided with a non-conducting handle.

The accompanying drawing is a side view of my device.

The object of my invention is to produce a simple, cheap, and useful implement for kitchen use, and I accomplish this object by the construction shown.

I construct the device, except the handle, of metal, casting being the cheapest method of constructing the frame and hooks. I find that a metallic handle soon becomes heated in a device of this compactness. I therefore provide a handle of some non-conducting substance—wood being preferable, because of its being cheapest.

The handle is shown in section in the drawing, and is held in place by either a rod through its center riveted in the uprights at each end, or by pins projecting a short distance in the handle at each end.

To stiffen the device and hold the uprights firmly in position the brace $m$ extends from one side to the other.

Upon the upright $k$, I cast a sharp projecting part, $c$, of the shape shown, which operates as a can-opener. The lower portion has the stove-lid lifter $a$, and in the end I cut the notch $d$, thus providing a convenient tack or nail puller for kitchen use. A downwardly-projecting part, $o$, with the part $a$, forms a convenient device for lifting shallow dishes.

The hooks $f$, $e$, and $b$ will be found convenient in the lifting and handling of pots, kettles, &c. The hook $b$ extends outward, as shown, and forms a convenient device for tipping pots or other vessels. The edge of the vessel being tipped is held between the hook and frame, and upon being tipped by the implement is firmly grasped by the hook until released by moving the implement in the opposite direction.

$n$ represents a series of projections, between which the edges of many dishes may engage and be carried or moved. These projections may also serve the purpose of a meat-tenderer.

Having therefore described my invention, what I claim as new, and desire to secure by Letters Patent, is—

1. A kitchen utensil embracing in its construction a non-conducting handle, $g$, and the uprights $j$ and $k$, having hooks $d$ and $b$, substantially as shown.

2. The upright $k$, having can-opener $c$, in combination with an upright, $j$, a handle, and one or more hooks, arranged for convenient use, substantially as shown, for the purposes stated.

3. In a kitchen implement having uprights $k$ and $j$ and a non-conducting handle $g$, the stove-lid lifter $d$, notched for use as a nail-puller, substantially as shown.

4. In a kitchen utensil, the uprights having one or more hooks arranged at convenient points below, and having a non-conducting handle, substantially as shown.

BENJAMIN F. ADAMS.

Witnesses:
ALLEN WEBSTER,
O. R. HOLLOWAY.